(12) United States Patent
Kapadia et al.

(10) Patent No.: US 7,766,112 B2
(45) Date of Patent: Aug. 3, 2010

(54) FRONT END MODULE WITH BREAKAWAY RADIATOR

(75) Inventors: Ameil A. Kapadia, Shelby, MI (US); Michelle Vanbuskirk, Rochester Hills, MI (US); Martin R. Matthews, Troy, MI (US)

(73) Assignee: Magna International Inc., Aurora, Ontario (CA)

( * ) Notice: Subject to any disclaimer, the term of this patent is extended or adjusted under 35 U.S.C. 154(b) by 521 days.

(21) Appl. No.: 11/764,391

(22) Filed: Jun. 18, 2007

(65) Prior Publication Data

US 2008/0308333 A1   Dec. 18, 2008

(51) Int. Cl.
*B60K 11/04* (2006.01)

(52) U.S. Cl. .............. 180/68.4; 180/68.6; 296/187.09; 296/193.09

(58) Field of Classification Search ............... 180/68.4, 180/68.6; 296/187.09, 187.11, 193.09
See application file for complete search history.

(56) References Cited

U.S. PATENT DOCUMENTS

| | | | |
|---|---|---|---|
| 4,579,184 A | 4/1986 | Hiramoto | |
| 6,364,403 B1 * | 4/2002 | Ozawa et al. | 296/187.09 |
| 6,675,921 B2 | 1/2004 | Brown | |
| 6,742,615 B2 | 6/2004 | Cristante et al. | |
| 6,997,490 B2 * | 2/2006 | Evans et al. | 293/120 |
| 7,044,246 B2 | 5/2006 | Fujieda et al. | |
| 7,255,377 B2 * | 8/2007 | Ahn | 293/102 |
| 2001/0001994 A1 * | 5/2001 | Enomoto et al. | 180/68.4 |
| 2002/0129981 A1 * | 9/2002 | Satou | 180/68.6 |
| 2004/0084236 A1 * | 5/2004 | Okai et al. | 180/68.4 |
| 2004/0188155 A1 * | 9/2004 | Fujieda | 180/68.4 |
| 2004/0195020 A1 * | 10/2004 | Suwa et al. | 180/68.4 |

* cited by examiner

*Primary Examiner*—Jeffrey J Restifo
*Assistant Examiner*—John R Olszewski
(74) *Attorney, Agent, or Firm*—Warn Partners, P.C.

(57) ABSTRACT

An automotive vehicle is provided which includes a structural member, a bumper movable with respect to the structural member upon an impact of said vehicle with an object, and a radiator for cooling fluid of a component of the vehicle, the radiator being mounted with the structural member. Movement of the bumper within predetermined limits causes the radiator to be dismounted with respect to said structural member minimizing material damage to the radiator.

21 Claims, 7 Drawing Sheets

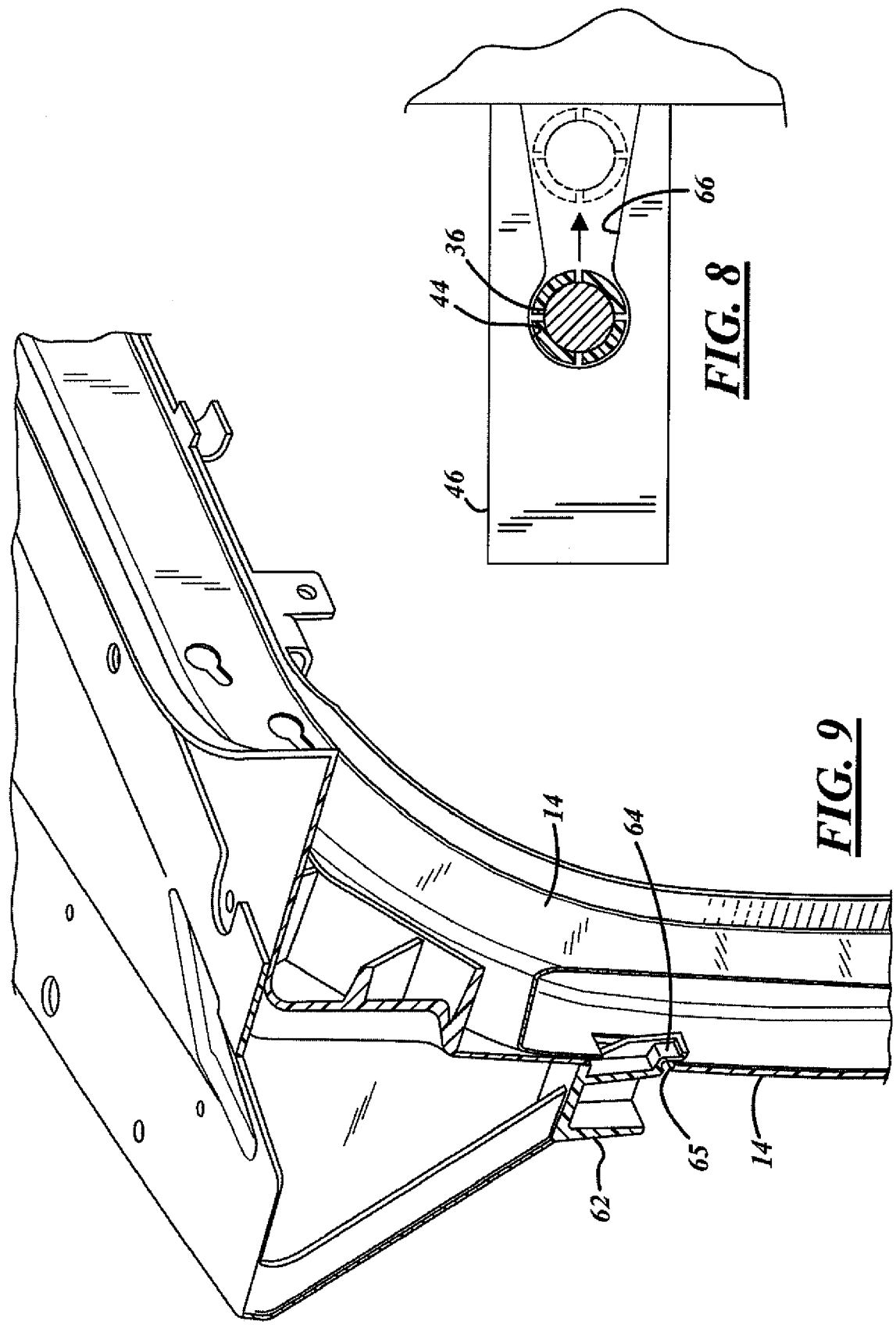

FRONT END MODULE WITH BREAKAWAY RADIATOR

FIELD OF THE INVENTION

The present invention relates to an arrangement to prevent damages to radiators in low speed automotive crashes.

BACKGROUND OF THE INVENTION

It is well known in the art to provide a bumper for automotive vehicles. Initially bumpers were rugged, strong structures to prevent damage to the vehicle upon impact with an object. Over the process of time, bumpers became more ornamental with less strength. The loss of strength in bumpers caused an increase in the amount of damage vehicles experienced in low speed crash situations. In the most recent decades there has been a continuing quest to reduce repair costs experienced by automotive vehicles in low speed crash situations. It is desirable not only to minimize possible damage to the bumper in low speed crash situations, but to also minimize damage to the radiator in low speed crash situations.

SUMMARY OF THE INVENTION

To meet the above noted desire, the present invention is brought forth. In one embodiment of the present invention, a front end module is provided. The front end module has a bumper that is moveable with respect to a remainder of the front end module upon impact of a vehicle with an object. A radiator is mounted with the front end module. Upon impact of the vehicle with an object, the moveable portion of the bumper impacts a load bar. The load bar transmits force from the bumper to the radiator to dismount the radiator in a non-destructive fashion from the front end module. Due to the above noted arrangement, material damage to the radiator is minimized or eliminated in a low speed crash occurrence.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 is a view take along line 8-8 of FIG. 7;

FIG. 9 is a sectional view of an embodiment of the present invention having a beauty cover with a tongue which fits into a slot of a reinforcement of the front end module.

DETAILED DESCRIPTION OF THE PREFERRED EMBODIMENTS

Figure 1:
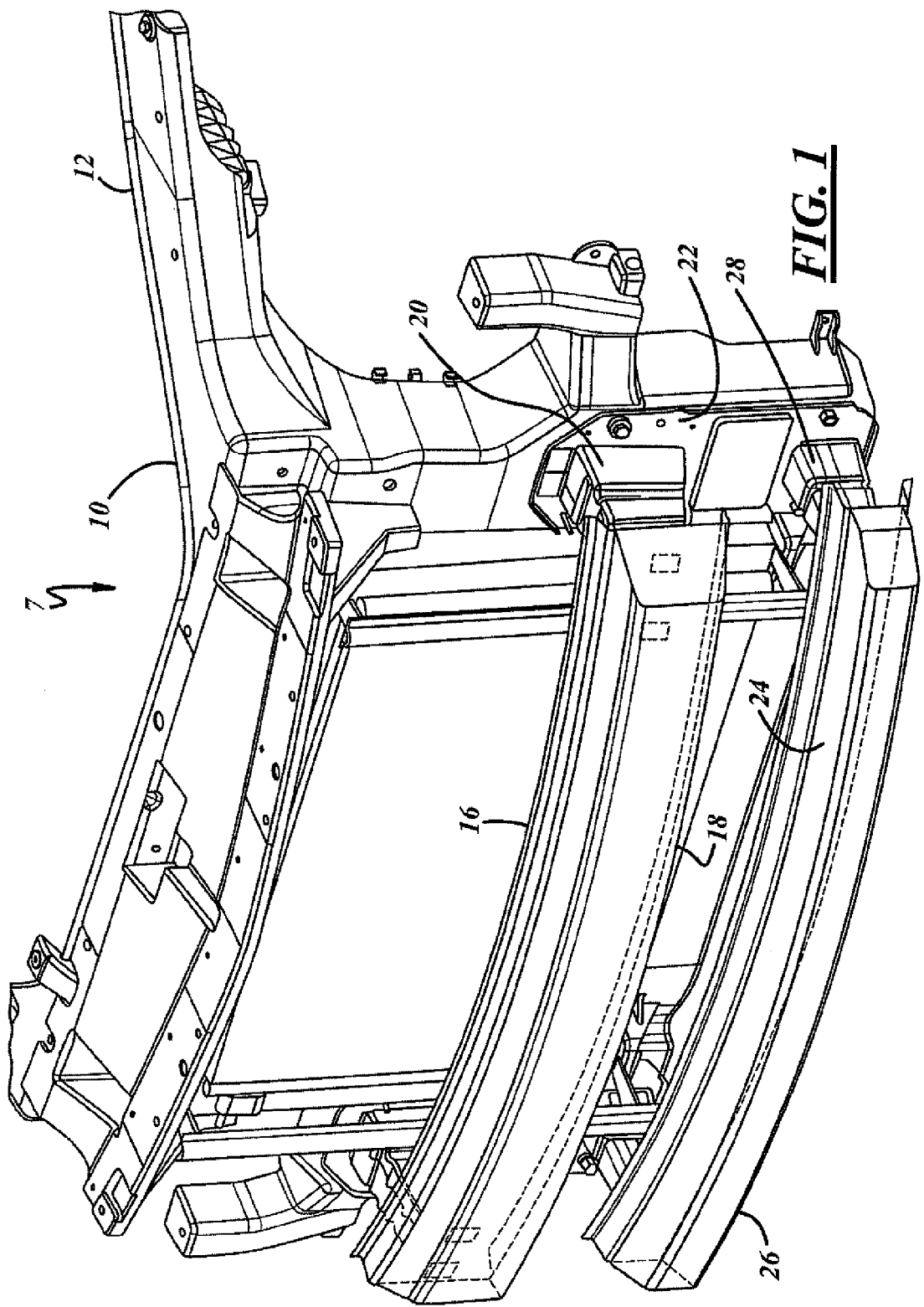
FIG. 1 is a front perspective view of a portion of an automotive vehicle, according to the present invention, having a front end module which mounts an engine coolant radiator, an air conditioning condenser radiator, along with upper and lower bumpers.
Figure 2:
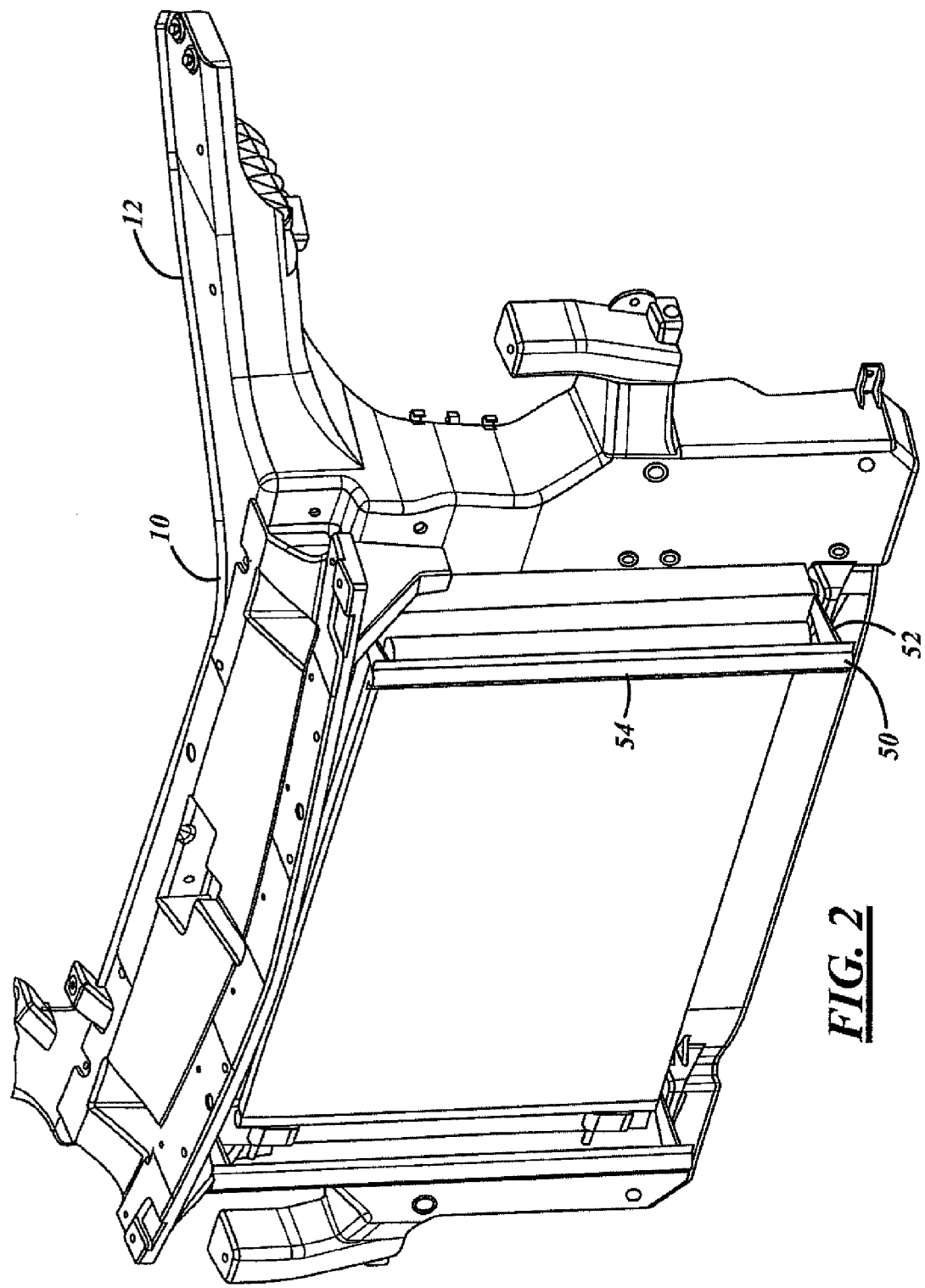
FIG. 2 is the front end module shown in FIG. 1 with the bumpers removed.
Figure 3:
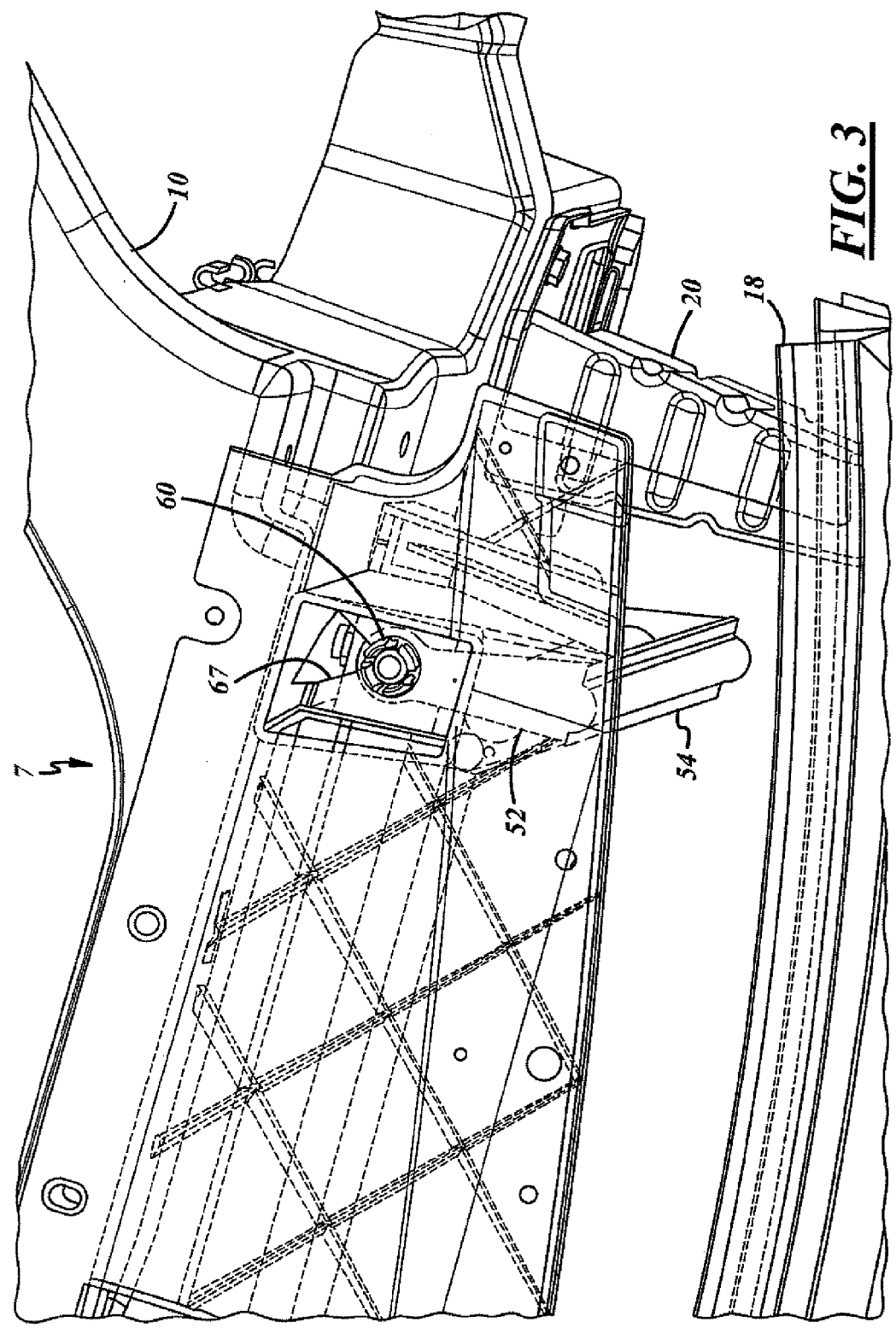
FIG. 3 is a enlarged top perspective view of a portion of the front end module shown in FIG. 1.
Figure 4:
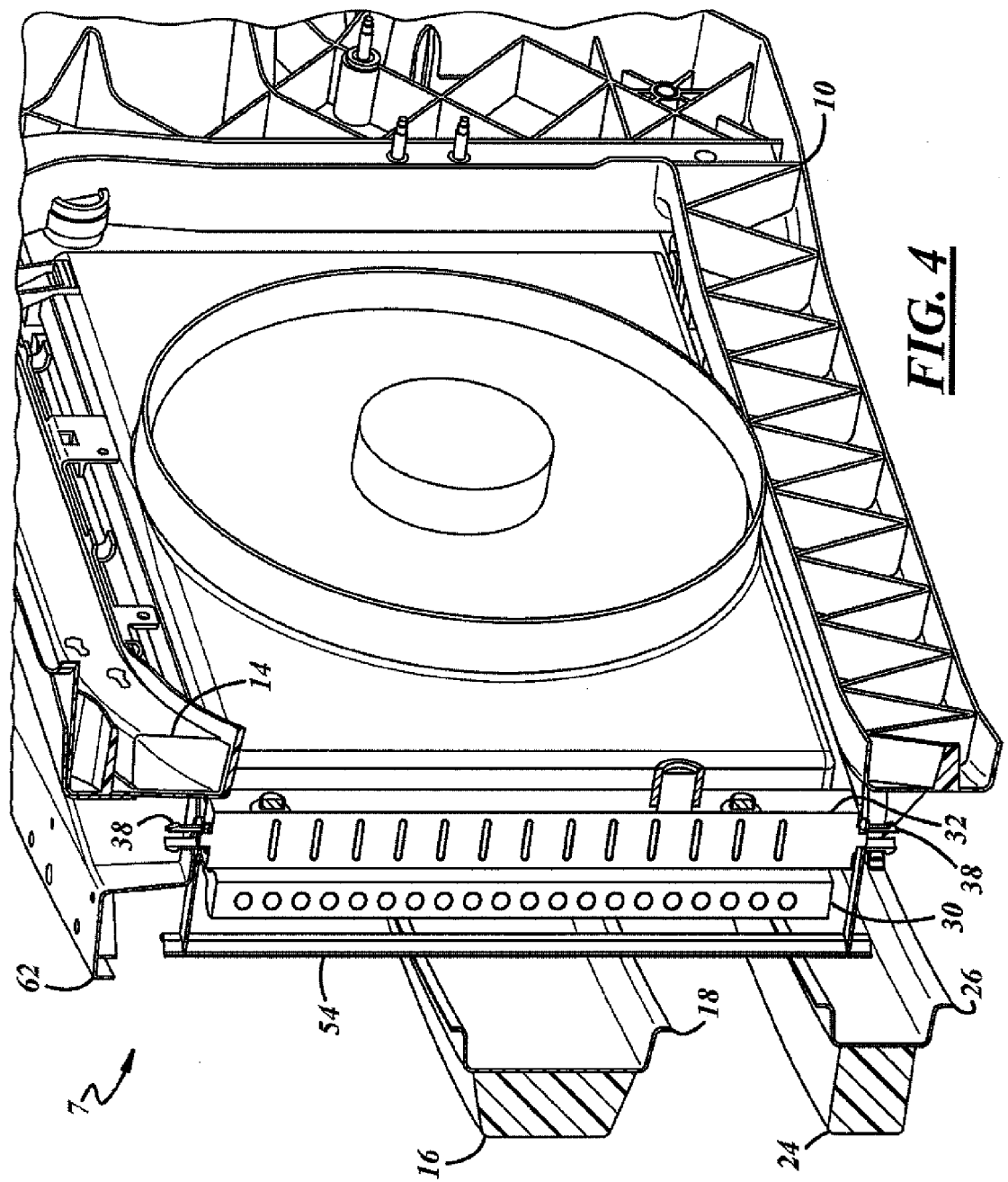
FIG. 4 is a rear perspective view partially sectioned of the front end module shown in FIGS. 1-3.
Figure 5:
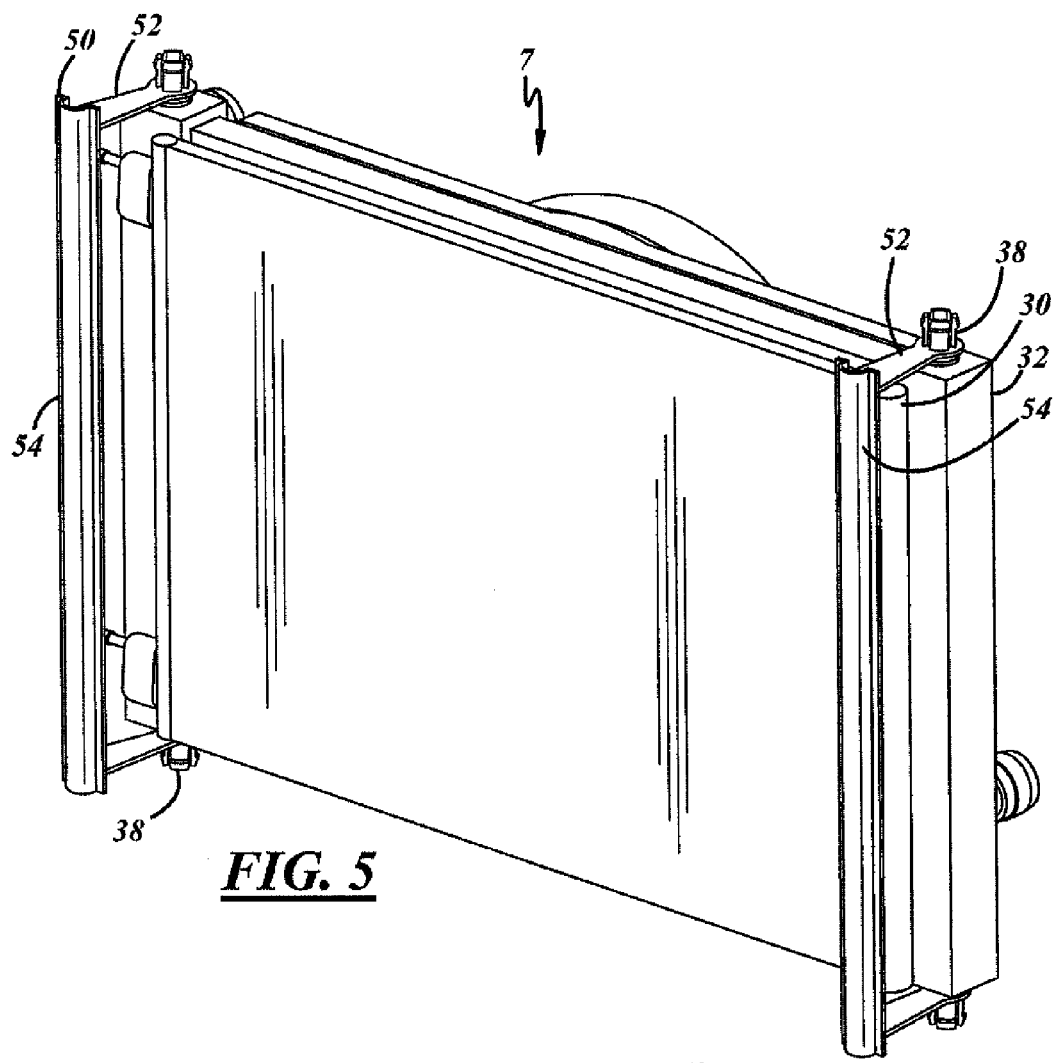
FIG. 5 is a perspective view of the radiators and load plate shown in FIGS. 1 and 2.

The following description of the preferred embodiment(s) is merely exemplary in nature and is in no way intended to limit the invention, its application, or uses.

Referring to FIGS. 1-9, an embodiment of a vehicle 7 of the present invention has a structural member provided by a front end module (FEM) 10. The FEM 10 is typically fabricated from a metal or polymeric material such as plastic or other suitable materials. The FEM 10 has two projecting arms 12 which mount front end lighting hardware (not shown). As best shown in FIG. 9, the FEM 10 is reinforced by a metal rectangular tube 14. The FEM 10 is connected with the chassis of the vehicle (not shown).

Connected to the FEM is an upper bumper 16. The bumper 16 has an impact bar 18. The impact bar 18 is supported by two posts 20. The posts 20 are connected with a force distribution plate 22 that is fastener connected to the FEM 10. The impact bar 18 can have relative movement with respect to the vehicle 7 and the FEM 10 in a low speed crash situation.

Positioned underneath the bumper 16 is a lower bumper 24. Lower bumper 24 has an impact bar 26 mounted by posts 28. The posts 28 are connected to the plate 22. The impact bar 26 can have relative motion with respect to the vehicle 7 and FEM 10 in a low speed crash situation.

Figure 7:
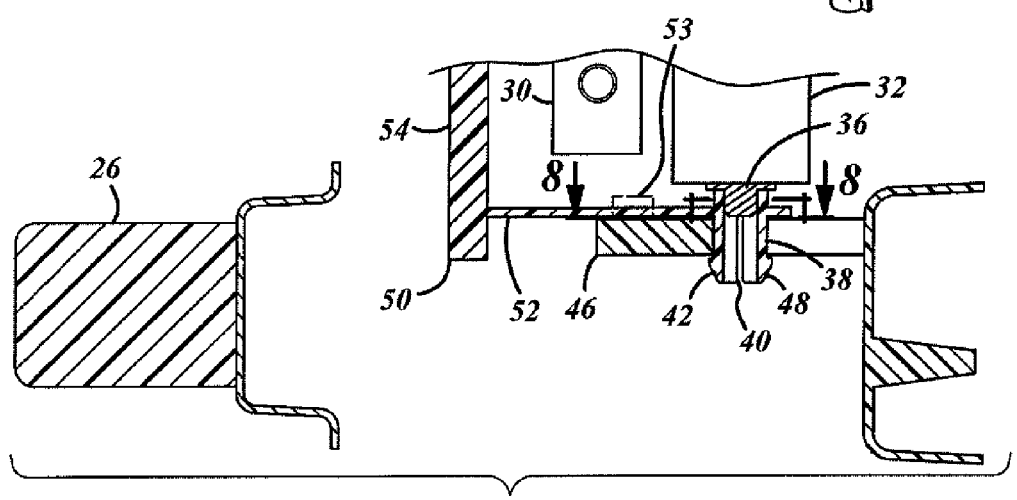
FIG. 7 is an enlarged view of a portion of the section view of FIG. 6.
Figure 6:
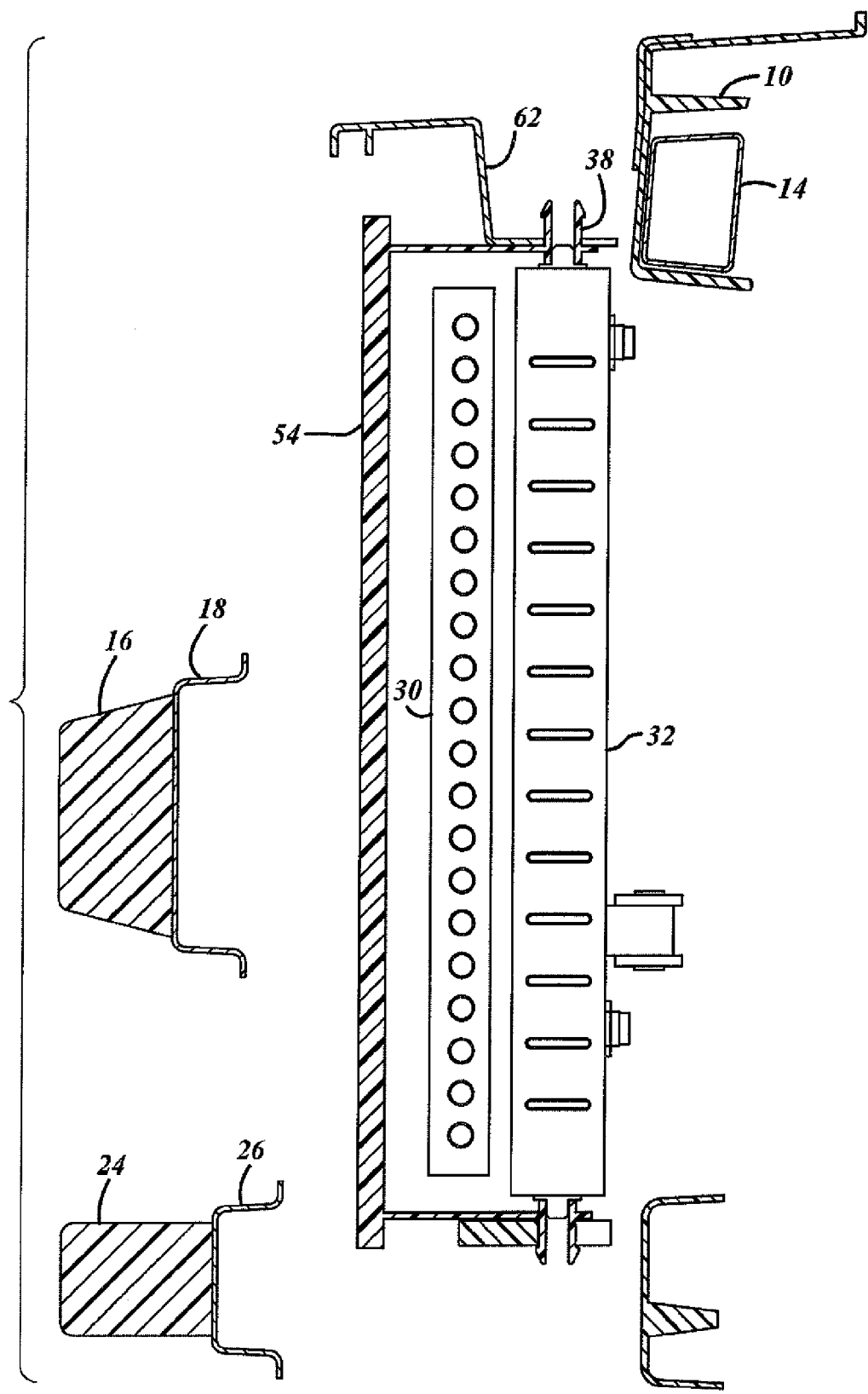
FIG. 6 is a section view that is taken along a portion of the load plate shown in FIG. 1.

Mounted to the FEM 10 behind the bumpers 16 and 24, are an air conditioning condenser radiator 30 and an engine coolant radiator 32. The condenser radiator 30 provides cooling for the refrigerant fluid of air conditioning components of the vehicle. The radiator 32 provides cooling for coolant fluid for an engine and related components. The radiator 30 is supported from the radiator 32. The radiator 32, adjacent its left and right lateral sides and upper and lower ends has extending posts 36 (FIG. 7). The posts 36 can be integral with the radiator 32 or can be separate members connected as shown. The posts 36 can be metallic or polymeric. The posts 36 are encircled by a compliant tubular clip 38. Tubular clip 38 has a series of geometrically spaced serrations 40 which divide it into fingers 42. The serrations 40 allow the fingers 42 to be compliantly inserted within an eyelet 44 provided in a generally horizontal shelf 46 of the FEM 10 (adjacent the radiator 32 lower end). After insertion of the fingers 42 within the eyelet 44, the fingers 42 of the clip 38 will have a compression or interference fit with the posts 36 as well as with the eyelet 44. The fingers 42 also have arrowheads 48 to facilitate the insertion of the fingers 42 into the eyelet 44.

The clips 38 can be metallic, however, in the application shown the clips 38 are fabricated using a polymeric material such as plastic. The clips 38 are integrally connected with a load plate 50. Note: As used in regards to the present invention, the term plate refers to any member that can transmit a load under compression. The term "plate" is not limited to planar members. The load plate 50 has fore and aft extensions 52. In an alternate embodiment, the fore and aft extensions 52 extend through two anti-rotation guides 53 (shown in phantom in FIG. 7 only) to prevent the extensions 52 from rotating in a crash situation. The extensions 52 are integrally connected to vertically extending rails 54. The rails 54 adjacent their top end are integrally connected with top fore and aft extensions 52. The top fore and aft extensions 52 are connected with top clips 38. FEM 10 also includes a fastener connected polymeric beauty cover 62. The top clips 38 fit within eyelets 60 provided by the beauty cover 62. Removal of the beauty cover 62 provides access to the radiators 30 and 32. A rear end of the beauty cover 62 has a tongue projection 64 insertably supported within a slot 65 provided in the tubular member 14.

In a low speed crash, impact bars 18 or 26 move backward and contact the load bar rails 54. The rearward movement of the rails 54 will push the extensions 52 rearward. The clips 38 are pushed back out of the eyelets 44 (or eyelets 60) into an openings 66 and or openings 67. The above noted action dismounts the radiator 32 and condenser radiator 30 and minimizes or eliminates material damage so long as the crash energy absorption and resultant bumper impact bar movement is under predetermined limits.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An automotive vehicle comprising:
    a structural member having four eyelets, wherein each eyelet has an opening;
    a bumper movable with respect to said structural member upon an impact of said vehicle with an object;
    a radiator for cooling fluid of a component of said vehicle;
    four posts connected to said radiator;
    four clips each integral with fore and aft load bar extensions, said extensions connected with vertically extending rails, wherein each of said clips correspond with one of said eyelets and each of said posts correspond with one of said clips; and the radiator is connected to said four eyelets via said four posts; and wherein the four posts have interference within said four clips; and
    wherein movement of said bumper within predetermined limits causes said radiator to be dismounted with respect to said structural member minimizing material damage to said radiator.

2. A vehicle as described in claim 1, wherein said radiator is mounted to said structural member on two sides; and wherein the structural member is adjacent the upper and lower ends of the radiator.

3. A vehicle as described in claim 1, wherein said structural member is a front end module.

4. A vehicle as described in claim 1, wherein said clip have connected thereto a load plate.

5. A vehicle as described in claim 1 further including an anti-rotation guide to align said clips to prevent said clips from rotating.

6. A vehicle as described in claim 4, wherein said load plate defines said vertically extending rails.

7. A vehicle as described in claim 4, wherein said load bar extensions is integral with said load plate.

8. A vehicle as described in claim 1, wherein said structural member includes a front end module having along its upper end a beauty cover and said radiator is connected at its upper end with said beauty cover.

9. A vehicle as described in claim 8, wherein said front end module and said beauty cover are fabricated from a polymeric material.

10. A vehicle as described in claim 8, wherein said front end module is supported by a metallic reinforcement and said reinforcement has a slot and a projection of said beauty panel is insertably supported within said slot.

11. A vehicle as described in claim 1, wherein said bumper is connected to said structural member and said bumper has an impact bar moveable with respect to said structural member.

12. An automotive vehicle comprising:
    a front end module;
    a bumper connected with said front end module, said bumper having an impact bar moveable with respect to said front end module upon impact of said vehicle with an object;
    a radiator for cooling fluid of a component of said vehicle, said radiator having on opposite lateral sides, upper and lower posts extending therefrom;
    fore and aft extending load bars, said load bars being connected with clips, said clips being compliantly inserted within front end module eyelets having an opening, said clips holding said radiator posts with said front end module; and
    wherein movement of said impact bar within predetermined limits can cause said impact bar to contact said load bars, causing said radiator to be dismounted from said front end module minimizing material damage to said radiator.

13. An automotive vehicle comprising:
    a structural member having an eyelet with an opening;
    a bumper movable with respect to said structural member upon an impact of said vehicle with an object;
    a radiator for cooling fluid of a component of said vehicle, wherein said radiator is connected to said structural member eyelet by a clip that is connected to a load plate having vertically extending rails; and
    wherein movement of said bumper within predetermined limits causes said radiator to be dismounted with respect to said structural member minimizing material damage to said radiator.

14. The vehicle as described in claim 13, wherein said radiator is mounted to said structural member on two sides; and wherein the structural member is adjacent the upper and lower ends of the radiator.

15. The vehicle as described in claim 13, wherein said structural member is a front end module.

16. The vehicle of claim 13 further comprising an anti-rotation guide to align said clip to prevent said clip from rotating.

17. The vehicle as described in claim 13, wherein said clip is integral with said load plate.

18. The vehicle as described in claim 13, wherein said radiator has a post connected thereto and said post fits within said clip.

19. The vehicle as described in claim 13, wherein said structural member includes a front end module having along its upper end a beauty cover and said radiator is connected at its upper end with said beauty cover.

20. The vehicle of claim 19, wherein said front end module is supported by a metallic reinforcement and said reinforcement has a slot and a projection of said beauty panel is insertably supported within said slot.

21. The vehicle as described in claim 13, wherein said bumper is connected to said structural member and said bumper has an impact bar moveable with respect to said structural member.

* * * * *